United States Patent [19]

Bourg

[11] Patent Number: 4,471,954

[45] Date of Patent: Sep. 18, 1984

[54] SHEET COLLATOR

[76] Inventor: Christian P. Bourg, "Le Colombier", Rue de Blanmont 5, 5873 Hévillers, Belgium

[21] Appl. No.: 368,687

[22] Filed: Apr. 15, 1982

[30] Foreign Application Priority Data

Mar. 1, 1982 [EP] European Pat. Off. ........... 82101556

[51] Int. Cl.$^3$ ...................... B65H 39/02; B65H 39/04
[52] U.S. Cl. ...................................... 270/58; 271/263
[58] Field of Search ..................... 270/56, 58; 271/263

[56] References Cited

U.S. PATENT DOCUMENTS 3,561,752  2/1971  McCain ................................. 270/56
4,170,346 10/1979  Murray .............................. 270/56 X
4,221,372  9/1980  Foerster ................................ 270/58

OTHER PUBLICATIONS

IBM Technical Disclosure Bulletin, vol. 19, No 12, May 1977, Double Document Detect System.

*Primary Examiner*—A. J. Heinz

*Attorney, Agent, or Firm*—Murray, Whisenhunt and Ferguson

[57] ABSTRACT

The sheet collator comprises a plurality of sheet loading pockets each associated with a sheet ejector for ejecting single sheets into a common sheet conveyor path from the respective pocket. A photo-electric, e.g. infrared sheet passage detector is mounted between each pocket and the common sheet conveyor path. In an initial set-up cycle, upon the passage of an ejected sheet, the detector will take eight samples of the transparency or reflectivity of the passing sheet of paper. These samples are averaged to generate a detection signal representative of the transparency or reflectivity of the sheet of paper. The detection signal is stored. In operation, it is compared with the detection signals generated during subsequent sheet passages. When the compared detection signals are not the same, an alarm signal will be generated and used to stop the operation of the collator at the end of a completed collating cycle. The detection signals are analyzed to discriminate between missing sheet and multiple sheet conditions.

21 Claims, 9 Drawing Figures

SHEET COLLATOR

BACKGROUND OF THE INVENTION

This invention relates to a method of controlling a sheet collator having a plurality of sheet loading pockets for receiving sheets to be collated. More particularly, this invention relates to a method of controlling sheet collators of the above mentioned type in a manner to detect missing or double sheet conditions and to allow appropriate intervention of the operator upon detection of missing or double sheet conditions. The invention further relates to a sheet collator suitable for performing the above method.

In a conventional sheet collator as disclosed in U.S. Pat. No. 3,887,176, a plurality of sheet loading pockets are arranged in parallel inclined relationship in a machine frame below a common sheet conveyor path. A sheet ejector is associated with each sheet loading pocket and adapted to eject single sheets from the associated sheet loading pocket into the generally horizontally extending common sheet conveyor path. Each sheet ejector comprises an ejection roller in frictional engagement with the uppermost sheet of the supply of sheets within the loading pocket. The drive of each sheet ejection roller is derived from the common driving motor of the collator also driving a plurality of opposed and engaging conveyor roller pairs arranged along the common sheet conveyor path. Each conveyor roller pair is mounted at the end of a deflection passage guiding each sheet ejected from the associated loading pocket into the nip formed between the two opposed rollers. In operation of the collator, each ejection roller is momentarily driven by actuation of a clutch arranged between each ejection roller and a common drive shaft. Each ejection roller is provided with a free wheeling system. When an ejected sheet is engaged in the entrance gap between two opposed conveyor rollers, the sheet will be completely moved out from its associated loading pocket although the ejection roller was only momentarily activated.

In a collating operation, care should be taken that each collated set of sheets is complete, i.e. that no sheets are missing. In order to check the completeness of each collated set, the conventional collator includes sheet passage detectors of contact switch type associated with each sheet ejector. Should any of the ejected sheet ejectors fail to supply a sheet towards the common sheet conveyor path, this would be detected by the associated sheet passage detector.

Sheet passage detectors of contact switch type are subject to wear and malfunctions after extended time of use. In addition, the activation of contact switches requires an activating force that can be afforded only by paper having considerable strength. Still further, while sheet passage detectors of contact switch type may be suitable to determine whether any sheet was ejected or not, they are unable to determine whether only a single or more than one sheet was ejected from the associated sheet pocket during a single ejection operation. Clearly, it is also desired to be able to check any collated set of sheets whether there are any sheets in excess of the total required number of sheets of a collated set, i.e. double or multiple sheets.

OBJECTS OF THE INVENTION

It is a primary object of the invention to provide a method of controlling a sheet collator incorporating an improved sheet number accuracy control.

A related object of the invention is to provide a method of controlling a sheet collator allowing reliable missing sheet detection over extended periods of use without requiring readjustment or service of the sheet passage detection system.

A further object of the invention is to provide an improved method of controlling a sheet collator not only allowing reliable missing sheet detection, but also allowing the determination of excess sheet conditions, i.e. double or multiple sheets.

A still further object of the invention is to provide a method of the above type allowing reliable discrimination between missing, double and multiple sheet conditions by analysing a detection signal highly representative of the actual presence of a single sheet of paper across the detection system.

A still further object of the invention is to provide a method of controlling the sheet ejectors of the collator in timed fashion to achieve constant overlap between the leading edges and trailing edges of complete sets of ejected sheets.

A still further object of the invention is to provide sheet collator suitable for performing the above method.

SUMMARY OF THE INVENTION

The inventive sheet collator comprises a plurality of sheet loading pockets each associated with a sheet ejector for ejecting single sheets into a common sheet conveyor path from the respective pocket. A sheet presence detector is mounted between each pocket and the common sheet conveyor path. The sheet presence detector is preferably formed as a photoelectric detector having an infrared source arranged on one side of the sheet passage and an infrared light detector arranged on the opposed side of the sheet passage so that an infrared light beam emitted by the infrared light source and received by the infrared light detector will be intercepted and modulated upon each passage of a sheet therebetween. Upon each passage of an ejected sheet, the detector will generate a detection signal representative of the optic properties, e.g. the reflectivity or transparency of the sheet of paper. In practice, the detection signal will be an analog signal amplitude modulated by the varying transparency of the moving sheet, the moving sheet generally bearing imprinted information by which the transparency of the sheet is modulated.

The inventive method comprises the generation of detection signals representative of the transparency of a sheet detected by the photoelectric sheet presence detector upon each of successive passages of ejected sheets. At least one of the detection signals is stored and compared with another detection signal generated during a subsequent sheet passage. When the compared detection signal are not the same, an alarm signal will be generated. Preferably, the alarm signal will be used to stop the operation of the collator at the end of a completed collating cycle. The operator may then check and correct the collated set.

In accordance with a preferred embodiment, the detection signals are analysed to discriminate between missing sheet and multiple sheet conditions. In case of missing sheets, the detected infrared light intensity will be in excess of that transmitted through a single sheet between the infrared source and detector pair, and will be substantially inferior to the latter intensity in case of double sheet conditions. Thus, by determination of the sign of the difference between the compared detection signals, discrimination between missing and double sheet conditions may be achieved.

In accordance with still another preferred embodiment, the detection signals as analyzed for discrimination between missing and multiple sheet conditions are generated by calculating the average out of a predetermined number of individual transparency measurements performed during a single sheet ejection operation. An advantageous number of these measurements is eight.

While in the preceding embodiments the detection of sheet presence is based on a transparency measurement, in accordance with another embodiment, detection is based on reflectivity measurement, and both the light source and the light detector are arranged on the same side of the sheet passage.

Another preferred embodiment of the inventive sheet collator allows the detection of the particular missing sheet condition in which the uppermost sheet in a loading pocket is first engaged and advanced by the associated ejection roller during an ejection operation to a sufficient extent to have the sheet intercept the light beam of the sheet presence detector, but then fails to move on into the nip between a pair of opposed conveyor rollers to be completely pulled out of its pocket and travel along the conveyor path. This is achieved by performing an additional sheet presence detection between successive ejection operations. When the sheet is still present between the loading pocket and the associated pair of conveyor rollers after the normal termination of an ejection operation, as determined by an additional transparency (or reflectivity) measurement, this indicates the above mentioned particular sheet missing condition. For example, there may be a jam at the outlet of the sheet loading pocket.

The alarm signal representing a missing or a multiple sheet condition is preferably latched, and the operator is given an appropriate indication as to the kind of malfunction and the location it has occurred. Preferably, each sheet ejection station is provided with signal lamps one of which is activated in case of a missing sheet condition and the other of which is activated in case of a double sheet condition. In case of the above mentioned particular missing sheet condition, both signal lamps are preferably activated. If an alarm signal, i.e. missing or double sheet signal, is generated during a collating operation, the current collating cycle will be terminated and then the collator will be stopped. The operator may then correct the collated set of sheets and inspect the ejection station on which the missing or double sheet condition is signalled.

In order to detect the termination of a complete collating cycle, an additional sheet passage detector may be provided on the common sheet conveyor path to signal the passing of the last sheet of a collated set.

The malfunction indication signals will remain latched until the collator is restarted or alternately, a reset function is activated by the operator.

In accordance with another aspect of the invention, the operation of the activated sheet ejectors is timed in a manner to achieve an appropriate constant spacing between the successive ejected sheets travelling along the common conveyor path, preferably in such a manner that the leading edge of each sheet will overlap the trailing end of the preceding sheet, regardless whether all of the sheet ejection stations are activated or any of them are deactivated.

BRIEF DESCRIPTION OF THE DRAWINGS

Other details, features and objects of the invention will stand out from the description given below by way of non-limitative example and with reference to the accompanying drawings, in which:

FIG. 1 shows a conventional sheet collator having a plurality of successive sheet ejection stations only four of which are shown, i.e. stations 10, 12, 14, 16. Each sheet ejection station comprises one sheet loading pocket 18, 20, 22, 24, each with an associated sheet ejector 26, 28, 30, 32, respectively. The sheet loading pockets 18, . . . 24 are inclined and arranged immediately adjacent one another below a common horizontal sheet conveyor path 34 formed by a plurality of conveyor roller pairs 36 each comprising a driving roller 36B and an opposed driven roller 36A in frictional engagement therewith. Each conveyor roller pair 36 is associated with one of the stations 10, 12, 14, 16. The nips formed between the conveyor roller pairs lie in a common plane and are regularly spaced along the conveyor path 34, the plane being horizontal or inclined.

A guiding passage 38 formed between two opposed guiding walls 38A, 38B leads from each sheet loading pocket 18, . . . 24 into the entrance gap of the associated conveyor roller pair 36.

Each ejector 26, 28, 30, 32 comprises a belt-driven ejection roller 26A, 28A, 30A, 32A, respectively, rotatably mounted at the end of a spring loaded arm 26B, 28B, 30B, 32B, respectively, the other end of which is pivotably supported on the machine frame. Each ejection roller is urged into frictional engagement with the uppermost sheet of the associated sheet loading pocket. The drive of each ejection roller is derived through an electromagnetic clutch (FIG. 2) from a common collator driving shaft and transmitted to the ejection roller by driving belt 26C, 28C, 30C, 32C, respectively. Each ejection roller 26A, . . . 32A is driven by its associated drive belt 26C, . . . 32C through a free wheeling clutch (not shown) allowing free rotation of the roller when the uppermost sheet still in engagement therewith is engaged by the associated conveyor roller pair 36 rotating at a speed higher than that of the ejection roller.

Figure 1:
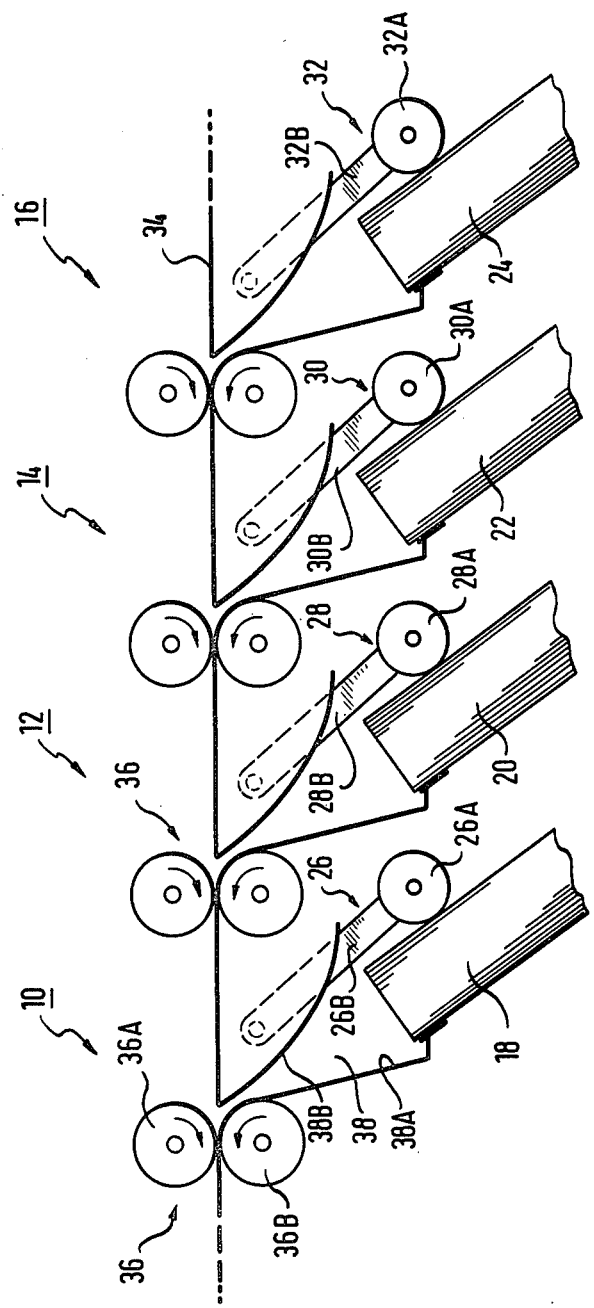
FIG. 1 is a diagrammatic and partial elevational view of a sheet collator, showing a plurality of adjacent sheet loading pockets with associated sheet ejectors and with a common sheet conveyor path.

Further details of the collator shown in FIG. 1 will be found in the above mentioned U.S. Pat. No. 3,887,176 hereby incorporated by reference.

Figure 2:
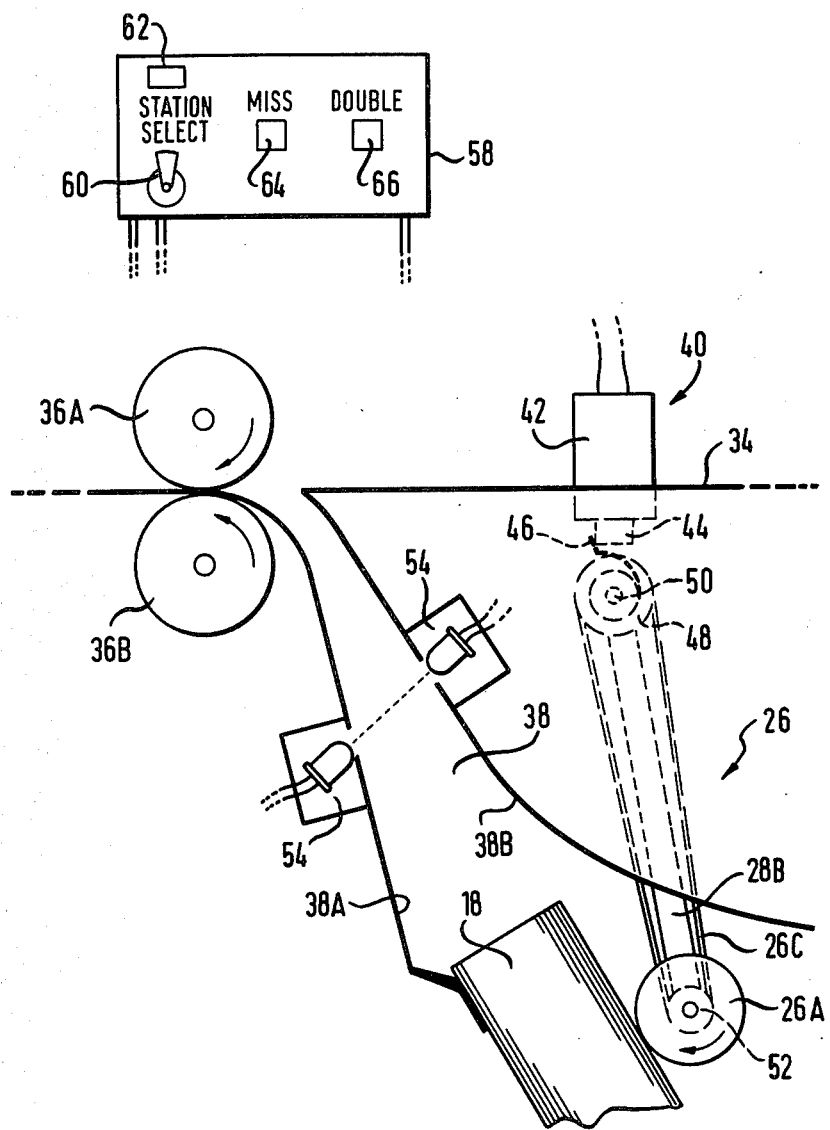
FIG. 2 is an enlarged diagrammatic view of a single sheet ejection station incorporating a sheet passage detector.

FIG. 2 shows a single sheet ejection station on an enlarged scale. In addition to the elements already disclosed with reference to FIG. 1, an ejector clutch 40 is shown including a solenoid 42 the movable plunser 44 of which cooperates with the free end of a spring type clutch 46 wrapped around the hub portion of a pulley 48 and the coaxial ajacent end of a continuously rotating driving shaft 50. In the retracted position of the movable plunser 44, the spring 46 is firmly wrapped about the hub portion and the driving shaft end to transmit drive to the pulley 48; in the projecting position of the movable plunser 44 as shown in FIG. 2, i.e. in the inoperative position of solenoid 42, the free end of spring 46 is engaged by the armature 44 unwrapping the spring from the driving shaft and interrupting drive to the pulley 48. The driving belt 26C extends between pulley 48 and another pulley 52 coaxial with ejection roller 26A and connected therewith through a free wheeling clutch.

For further details of the ejector system, reference is again had to the above mentioned U.S. Pat. No. 3,887,176.

As shown in FIG. 2, the inventive collator includes a photoelectric sheet passage detector formed by an infrared light source 54 mounted on one of the walls 38A of the sheet guiding passage 38 and an infrared detector 56 mounted on the opposed wall 38B of passage 38. The infrared source 54 is mounted at a position opposed to the position of infrared detector 56 so that a light beam extending from source 54 to detector 56 will be intercepted by any sheet passing through passage 38.

The infrared light source and detector pair 54, 56 is connected by leads (only partially shown) to a station selection and monitoring unit 58 also connected with solenoid 42 and with a central collator control unit to be disclosed later. The station selection and monitoring unit 58 includes a switch 60 having two positions one of which corresponds to the activation of the associated ejection station, as signalled by a selection lamp 62, and the other of which corresponds to the deactivated state of the associated ejection station. The station selection and monitoring unit 58 is further provided with a "miss" indicator lamp 64 and a "double" indicator lamp 66 and includes a station circuit to be disclosed later.

Figure 3:
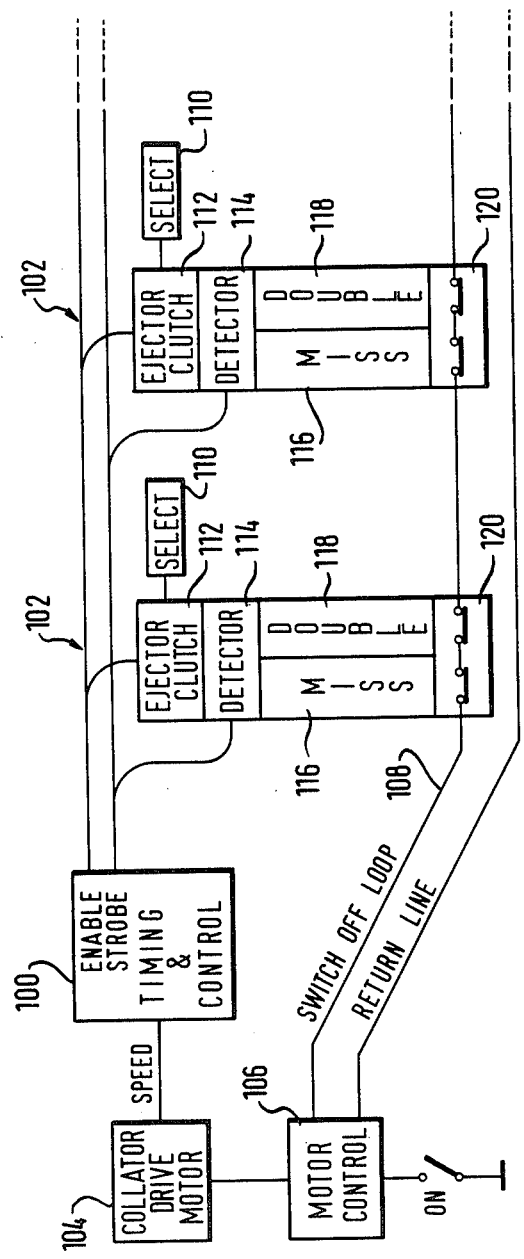
FIG. 3 is a block diagram of a first embodiment of a central timing and control unit and several sheet ejection stations of the collator controlled thereby.

FIG. 3 shows a first embodiment of a control system of the collator, including a central timing and control unit 100 connected with a plurality of station circuits 102 and a speed detection circuit 104 detecting the speed of the collator driving motor. The speed detection circuit 104 is in turn connected with a motor control circuit 106 which is further connected with each of the station circuits 102 through a motor switch-off loop 108 extending through all of the station circuits 102. Each station circuit 102 comprises a station selection switch 110, an ejector clutch driving circuit 112, a sheet passage detector circuit 114, a missing sheet indicator circuit 116, a double sheet indicator circuit 118 and a motor switch-off circuit 120.

In FIG. 3, only two station circuits are shown. It should be understood that the number of station circuits is just a matter of design, depending on the intended use of the collator. In a preferred embodiment of the invention, the collator includes 46 ejection stations and a corresponding number of station circuits. Using the station selection circuit 110, any of the stations may be switched either into an operative or into an inoperative state.

Figure 4:
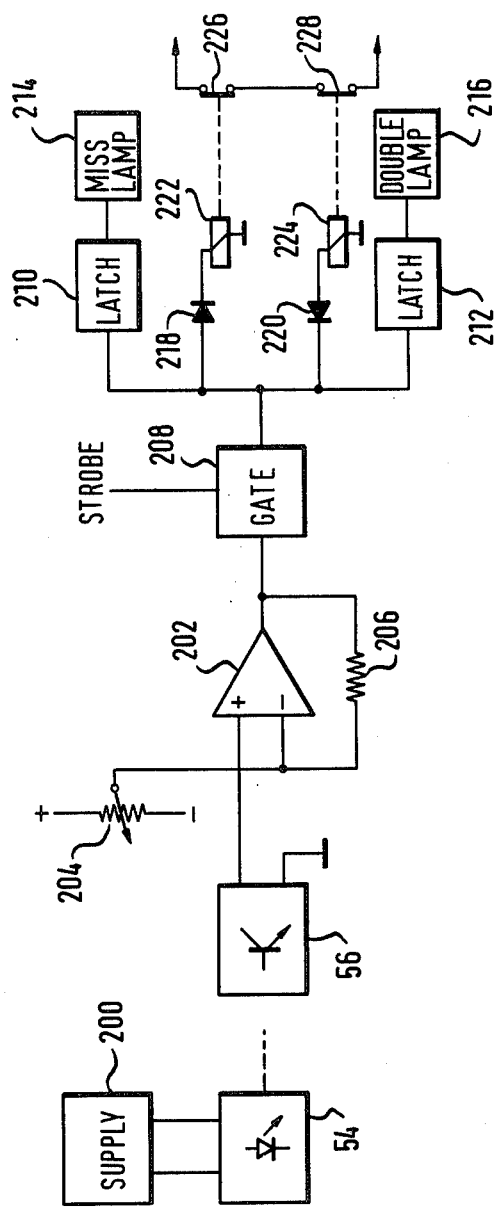
FIG. 4 shows a circuit diagram of one embodiment of a missing and double sheet condition detection circuit.

Referring now to FIG. 4, a first embodiment of a station circuit will be disclosed.

An infrared light source 54 comprising a light emitting diode is supplied by a controlled supply unit 200. A photodetector 56 comprising a phototransistor feeds its output to one input of an operational amplifier 202 the other input of which is connected with the tap of the potentiometer 204 the ends of which are connected to the positive and negative terminals of a stabilized DC voltage source (not shown). The output of operational amplifier 202 is fed back through a resistor 206 to the inverting input of the operational amplifier to adjust the gain thereof. The output of operational amplifier 202 is further connected with the input of a gate circuit 208 controlled by strobe pulses provided by the central timing and control unit. The output of gate circuit 208 is connected in parallel to the inputs of latching circuits 210, 212 the outputs of which are connected to drive a "miss" lamp 214 and a "double" lamp 216, respectively. In addition, the output of gate circuit 208 is connected in parallel through diodes 218, 220 to relay solenoids 222, 224, respectively, diodes 218 and 220 being arranged with opposed polarity. Solenoid 222 operates a normally closed contact pair 226, whereas solenoid 224 operates a normally closed contact pair 228, these contact pairs being series-connected and interconnected into the switch-off loop 108 shown in FIG. 3.

Operation of the embodiment shown in FIG. 4 is the following:

To perform an initial set-up operation, the operator will introduce a sheet between light source 54 and light detector 56. The transmitted light intensity will be detected by detector 56 and amplified by operational amplifier 202. Potentiometer 204 will now be adjusted by the operator so that the output of amplifier 202 will be approximately zero. Now, assuming that the selection switches 60 (FIG. 2) of all stations to be selected are in the appropriate position, the system is ready for operation.

In operation of the collator, should any activated station fail to eject a sheet during any collating cycle, the transmitted light intensity as detected by detector 56 and amplified by amplifier 202 would be in excess of the transmitted light intensity when potentiometer 204 was adjusted, providing an output signal through the strobed gate circuit 208 to latching circuit 210 to activate the "miss" lamp 214. Because of the presence of latching circuit 210, lamp 214 will remain lighted until latching circuit 210 is reset. At the end of a completed collating cycle, the timing and control unit 100 (FIG. 3) will stop operation of the collator. The operator may then check the collated set and inspect the station on which the "miss" lamp 214 is lighted. After having completed the collating set of sheets and eventually reloaded the station on which a missing sheet condition was detected, the collator may be restarted. Restarting of the collator may automatically reset the latching circuit 210.

In case more than one single sheet is ejected from a loading pocket, the detected transmitted light intensity will be less than that when potentiometer 204 was adjusted, providing an output signal of opposed sign on the output of amplifier 202, as latched by latching circuit 212 the output of which drives the "double" lamp 216. Latching circuit 212 may be automatically reset upon restarting of the collator, just as disclosed above with respect to the missing sheet condition.

The need of stopping the collator motor at the end of a completed collating cycle is signalled to the motor control circuit 106 (FIG. 3) by an interrupted switching-off loop 108, this interruption being caused by activation of either of solenoids 222, 224, simultaneously with activation of lamp 214 or 216.

Figure 5:
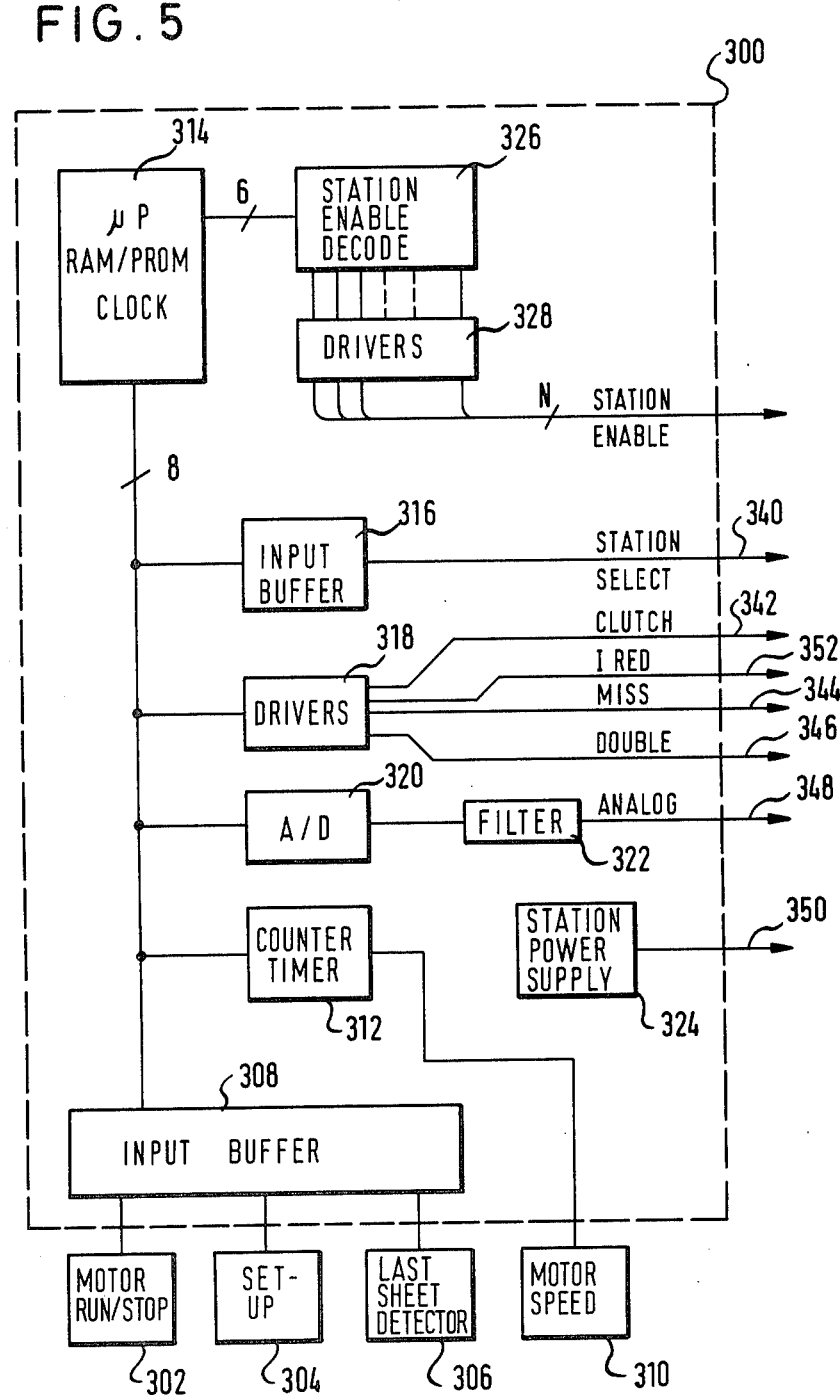
FIG. 5 is a block diagram of a preferred embodiment of a central collator control unit to be interconnected with a plurality of station circuits each associated with one sheet ejection station.
Figure 6:
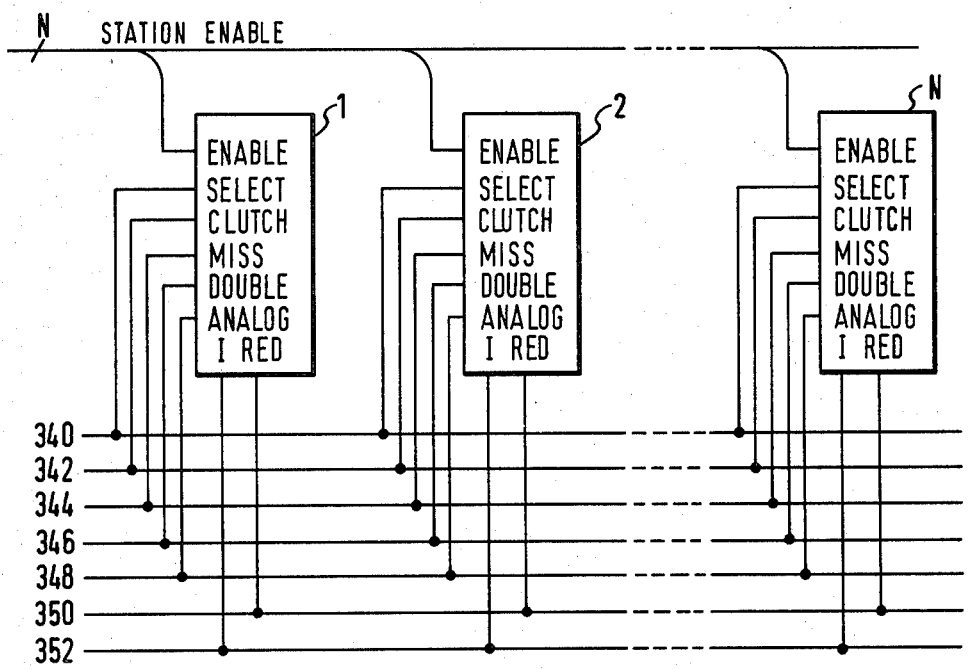
FIG. 6 is a block diagram showing interconnection of a plurality of station circuits each of which is associated with one sheet ejection station.

Referring now to FIGS. 5 and 6, a preferred embodiment of the invention will be disclosed.

FIG. 5 shows a central timing and control unit 300 of the collator to be interconnected with a plurality of station circuits shown in FIG. 6. Further connected to the central timing and control unit 300 are a motor run/stop switch 302, a set-up switch 304 and a last sheet detector 306, through an input buffer circuit 308, as well as a motor speed detecting circuit 310 transmitting a signal representative of the collator drive motor speed to a counter and timer circuit 312. The input buffer circuit 308 and the counter and timer circuit 312 are interconnected through an 8 bit bus line connected with the input/output ports of a microcomputer 314 comprising a random access memory (RAM), programmable read-only memory (PROM) and clock generator.

The timing and control unit 300 further comprises an input buffer 316 transmitting station selection signals from the station circuits to the 8 bit bus line. Driver circuits 318 transmit clutch, miss, double and IRED activation signals from the 8 bit bus line to the station circuits. An analog/digital converter 320 receives analog signals from the light intensity detectors 56 of the station circuits through a filter circuit 322 and delivers corresponding digital signals on the 8 bit bus line. A common station power supply unit 324 feeds in parallel all of the station circuits through a common power supply line.

The microcomputer system 314 has six further outputs connected through a 6 bit bus line to the input of a station enable decoding circuit 326 decoding the applied 6 bit pattern into N single bit enable signals transmitted through driver circuits 328 and a wire harness comprising N distinct lines to each of the N collator stations.

FIG. 6 shows the first two and the last of N station circuits of N collator stations. Each of the station circuits 1, 2, . . . N has an individual enable input controlled by an individual line. In contrast, the station selection outputs of all of the station circuits are connected in parallel to a station select line 340; the sheet ejector clutch inputs of the station circuits are all connected to a common clutch line 342; the missing sheet inputs of the station circuits are all connected with a common miss line 344; the double sheet inputs of the station circuits are all connected with a common double line 346; the analog signal outputs of the station circuits are all connected to a common analog line 348; the power supply inputs of the station circuits are all connected to a common power line 350; and the IRED activation inputs of the station circuits are all connected to a common IRED line 352.

Figure 7:
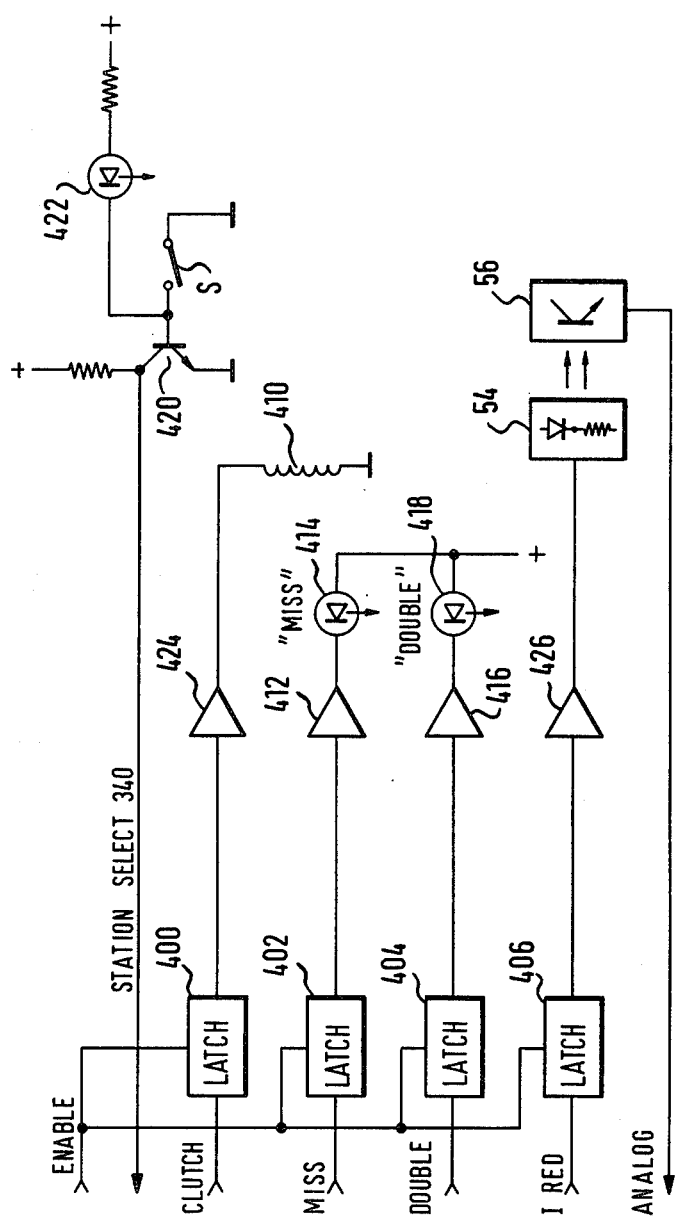
FIG. 7 is a schematic circuit diagram of one of the station circuits shown in FIG. 6.

FIG. 7 shows a preferred embodiment of a station circuit only generally shown in FIG. 6.

The clutch, miss, double and IRED lines are connected to the inputs of latch circuits 400, 402, 404, 406, respectively, controlled by enable signals from the enable line of the station circuit. The output of the latch circuit 406 feeds the input of a driver 426 (FIG. 7) the output of which enables the infrared light emitting diode of the infrared source 54. Optically coupled to the light source 54 is the phototransistor of photodetector 56 generating an analog signal applied on the common analog line 348. The output of the latch circuit 400 feeds the input of a driver 424 the output of which feeds the clutch solenoid 410 of the ejector of the corresponding collator station. The output of latch circuit 402 feeds the input of a driver circuit 412 the output of which feeds a light emitting diode 414 forming the "miss" lamp 64 in FIG. 2. The output of latch circuit 404 feeds the input of a driver circuit 416 the output of which drives a photodiode 418 forming the "double" lamp 66 of FIG. 2.

The station selection signal is transmitted on station select line 340 by controlling a transmitter 420 into the blocked state, connecting its base to ground through a switch S. When switch S is closed, transistor 420 is blocked, providing a high signal on line 340 and simultaneously energizing a light emitting diode 422 forming the "station select" lamp 62 of FIG. 2.

Figure 8:
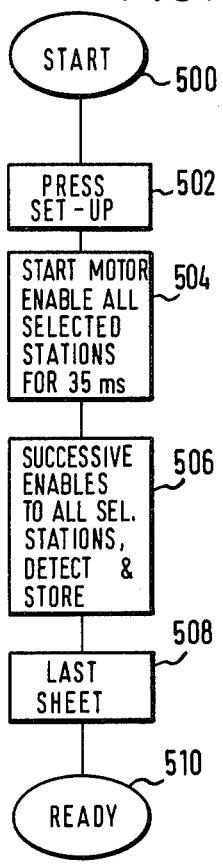
FIG. 8 is a flow diagram showing a set-up operation of the collator.
Figure 9:
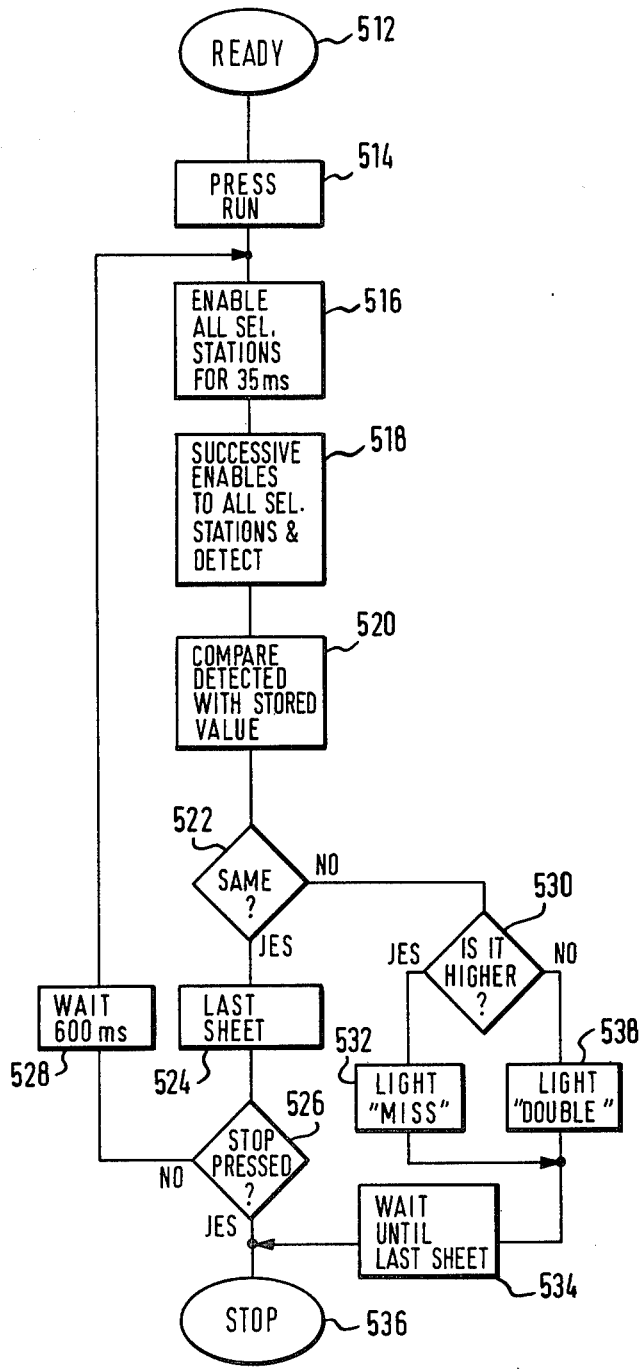
FIG. 9 is a flow diagram illustrating operation of the collator after an initial set-up operation.

The operation of the preferred embodiment of the invention shown in FIGS. 5, 6 and 7 will now be disclosed with reference to FIGS. 8 and 9.

In the preferred embodiment of the collator, the actual collating operation consisting of successive collating cycles is preceded by an initial set-up cycle. As shown in FIG. 8, the set-up cycle starts at step 500. In step 502, the set-up button 304 (FIG. 5) is pushed, and in step 504, the microcomputer system 314 starts the motor and sends a short enable pulse, e.g. of 35 ms, to all collator stations selected for operation by appropriate positioning of their selection switches S. This short pulse is sufficient to activate each clutch solenoid 410 until the respective uppermost sheet is seized by a conveyor roller pair 36 (FIGS. 1 and 2). Thus, a complete set of sheets will be collated in the initial set-up cycle. During the passage of each sheet across the respective sheet passage detector, step 506, short enable pulses are successively emitted to all selected stations for detection of the analog signals issued by the sheet passage detectors of the different activated stations, and these analog signals are transmitted through line 348 and filter 322 to the analog/digital converter 320 to be fed into the microcomputer system 314. The digital signals representing the transmitted light intensity of each station are then stored in the RAM part of the microcomputer system, each at a storage location associated with one collator station. Finally, in step 508 the passage of the last sheet of a collated set on the common sheet conveyor path 34 is detected to determine the end of a complete collating cycle. In step 510, the collator is ready for operation.

FIG. 9 shows the operation of the inventive collator after the initial set-up cycle is completed. In step 514, the motor run switch 302 is pressed so that the driving motor of the collator will start continuous operation. In step 516, all selected stations are activated for a short duration of e.g. 35 ms sufficient to assure appropriate operation of each sheet ejector. In step 518, all selected collator stations are then successively enabled for successive detection of the analog signals issued by each of the sheet passage detectors. Each of the detected signals representing the transmitted light intensity is then compared in step 520 with the signal of the same station as detected and stored in step 506 of the initial set-up cycle. If the values of the compared signals are the same, as determined in step 522, the passage of the last sheet of the cycle is then detected in step 524. If the motor stop switch 302 was not operated until that time, as determined in step 526, the system will return to step 516 after a waiting period sufficient to assure an appropriate constant spacing between two successive collating sets of sheets, e.g. 600 ms, as shown in step 528. Should the values of the compared signals in step 524 not be the same, step 530 will determine whether the detected signal is of higher value than the stored one. If it is, this indicates a missing sheet condition, and in step 532, the missing sheet lamp 514 will be activates. Subsequently, in step 534, the passage of the last sheet of a set is detected, and when this happens, the collator will automatically be stopped in step 536, at the end of the collating cycle. If step 530 determines that the detected transmitted light intensity is lower than that detected during the initial set-up cycle, this would indicate a double sheet condition, and in step 538, the double sheet lamp 418 will be activated. Subsequently, the passage of the last sheet of the set will be detected in step 534, and the collator will be automatically stopped in step 536 at the end of the collating cycle. Automatic stopping of the collator also occurs in case step 526 determines that the stop switch 302 was operated.

In the above disclosed embodiment, an initial set-up cycle is used as a reference for all successive collating cycles. In another embodiment, each preceding collating cycle is used as a reference for the successive collating cycle. In this case, the detected sheet passage detector signals are not continuously stored in the RAM part of the microcomputer system 314, but only for one cycle, to be then replaced by a set of new detected signals from the next cycle. In this embodiment, the collator control will be automatically updated to accommodate changes of the light transmission properties of the sheets to be collated as may occur in case of inconsistent quality of the sheets to be collated.

In the above disclosed embodiment, the detection of sheet presence between an ejector and the associated conveying roller pair is performed by a single transparency or reflectivity measurement. In accordance with another, preferred embodiment, the detection step includes a plurality of measurements performed during the ejection operation. An advantageous number of the separate measurements or samples is eight. After termination of the eight measurements, the detected samples are processed in microprocessor 314 to form the average value out of the eight samples. This average value is then used as the detection signals. By appropriate timing of the successive samples, a detection signal may be obtained which is highly characteristic for an actual sheet passage from the associated loading pocket to the common conveyor path. The timing of the samples is such that they are taken when an ejected sheet is calculated to intercept the infrared light beam of the associated photodetector. In a specific embodiment, the first sample is taken at a moment prior to the time when the leading edge of an ejected sheet is expected to intercept the infrared light beam of the photodetector. Six further samples are taken at regular spacing in time corresponding to spacings on the travelling sheet the sum of which is less than the sheet length. Thus, six of the samples provide an actual transparency or reflectivity measurement. The last sample is taken at a moment when the trailing edge of an ejected sheet is expected to have travelled beyond the infrared light beam of the photodetector.

In accordance with yet another preferred embodiment, an additional transparency or reflectivity measurement is taken at each ejection station between successive ejection operations. This additional detection step allows to determine whether a partially ejected sheet has actually reached the common conveyor path and travelled totally beyond the ejection station. If during this additional detection step, the presence of a sheet is detected, this would indicate that the sheet was only partially ejected and failed to reach the nip between the associated conveyor roller pair where is would be positively engaged and completely pulled out of the associated ejection station. Thus, when a sheet is only partially ejected, as detected by the additional detection step provided in accordance with this embodiment, this would lead to a particular missing sheet condition. Actually, the eight samples previously taken in the course of the ejection operation may lead to an average value or detection signal not sufficiently different from the stored detection signal to determine a missing sheet condition. In the addition detection step, the presence of a sheet is easily detected by a single measurement, because it is sufficient to distinguish between an intercepted light path condition and a non-intercepted light path condition.

When the above disclosed particular missing sheet condition is detected, both of the missing sheet lamp 214 and double sheet lamp 216 (FIG. 4) will be activated, indicating that not only the collated set has to be corrected, but also the respective ejection station has to be cleared.

In accordance with another aspect of the invention, the collator comprises a timed control of the selected ejection stations. The timing of the actuation of the selected ejection stations is determined in a manner to achieve a constant spacing between the ejected sheets travelling along the common conveyor path. Preferably, the spacing is determined to have a constant overlap of at least 10 mm, most preferably 10 to 180 mm, between the trailing and the leading ends of successive sheets. The overlap between the sheets greatly facilitates the required collating of the sheets.

The timing of the actuation of the selected ejection stations is preferably determined in a manner to achieve the above disclosed constant spacing or overlap regardless whether any of the stations between a series of selected stations is operative or not. In case one or more intermediate ejection stations have not been selected, i.e. they are unoperative, a corresponding delay should be introduced in the actuation of the preceding ejection stations so that the sheets ejected from the following selected stations will have sufficient time to travel along the common conveyor path to overlap the trailing edge of the last sheet ejected from the preceding ejection station.

It should be understood that the invention is not limited to the above disclosed embodiments and that many modifications may be brought thereto without departing from the scope of the invention.

What is claimed is:

1. A method of controlling a sheet collator having a plurality of sheet loading pockets each associated with a sheet ejector for ejecting single sheets into a common sheet conveyor path from the respective pockets, and with a sheet presence detector associated with each sheet ejector or where each sheet detector is mounted adjacent guide walls extending between each said pocket and said common sheet conveyor path for detecting the passage of sheets therebetween, comprising the following steps:
(a) generating a predetermined number of successive discrete samples of an optical property of each sheet passing by the sheet presence detector associated with each sheet ejector where said samples are taken at different points separated or given distance apart along the dimension of each sheet extending in the same direction as the travel direction of the sheet;
(b) forming an average of the samples for each sheet to generate a detection signal for that sheet;
(c) storing said detection signal to provide a stored detection signal;
(d) comparing said stored detection signal with at least a further one of said detection signals generated during subsequent sheet ejections at moments substantially corresponding to sheet passages at the associated sheet presence detector; and
(e) generating an alarm signal in response to a substantial difference between said stored detection signal and said further one of said subsequently generated detection signals 2. The method of claim 1, wherein said alarm signal is used to stop operation of said sheet collator.

3. The method of claim 2, wherein said sheet collator is operated in successive collating cycles, each collating cycle having a beginning and an end, and said sheet collator is stopped by said alarm signal at the end of the collating cycle in which said alarm signal was generated.

4. The method of claim 1, including the step of determining whether said stored detection signal has a value exceeding that of any of said further ones of said detection signals to generate a malfunction indication signal.

5. The method of claim 1, including the step of determining whether said stored detection signal has a value less than that of said further ones of said detection signal to generate a malfunction indication signal.

6. The method of claim 4 or 5, wherein said malfunction indication signal is representative of a missing sheet condition.

7. The method of claim 4 or 5, wherein said malfunction indication signal is representative of an excess sheet condition.

8. The method of claim 5, wherein said malfunction indication signal is used to activate visual malfunction signalling means.

9. The method of claim 1, wherein said sheet collator is operated in successive collating cycles, comprising the step of performing an initial set-up cycle in which a complete set of sheets is collated and one detection signal is generated and stored for each sheet and comparing detection signals generated during each successive collating cycle with said detection signals generated and stored during said initial set-up cycle.

10. The method of claim 1, in which said sheet collator is operated in successive collating cycles, wherein each detection signal is compared with a corresponding detection signal generated in the preceding collating cycle.

11. The method of claims 3 or 4, comprising the step of temporarily storing said alarm signal.

12. The method of claim 11, wherein said alarm signal is temporarily stored until said collator is restarted after having stopped operation thereof upon generation of an alarm signal.

13. The method of claim 1, wherein said sheet presence detector is a photo-electric detector.

14. The method of claim 13, wherein said photoelectric detector comprises an infrared light source and an infrared photodetector.

15. The method of claim 1, wherein each said sheet ejector successively ejects said single sheets, there being a predetermined time inverval between the ejection of successive sheets and where an additional sheet presence detection step is performed during said predetermined time interval to detect partially ejected sheets having failed to be removed along said common conveyor path.

16. A sheet collator for performing the method of claim 1, comprising:
a plurality of sheet loading pockets for receiving a supply of sheets to be collated;
a sheet ejector associated with each sheet loading pocket;
a common sheet conveyor path for receiving and transporting sheets ejected by each sheet ejector;
sheet presence detection means associated with each sheet loading pocket and arranged across a passage from said sheet loading pocket towards said common sheet conveyor path, each said sheet presence detection means generating its detection signal representative of said optical sheet property of each sheet passing from the associated sheet loading pocket towards said common sheet conveyor path;
storing means for respectively storing each said detection signal for providing stored detection signals;
comparing means for respectively comparing (a) each detection signal generated subsequent to its associated stored signal and (b) said associated stored detection signal for respectively determining differences therebetween;
alarm signal generated means for generating an alarm signal in response to at least one difference as determined by said comparing means; and
discrimination means for discriminating between a missing sheet condition or an excess sheet condition by respective determination of the signs of said differences determined by said comparing means.

17. The sheet collator of claim 16, wherein each said sheet passage detector comprises an infrared source and detector pair.

18. The sheet collator of claim 16, including temporary storing means for temporary storage of said alarm signal.

19. The sheet collator of claim 16, wherein said storing means are formed by the RAM part of the microprocessor/microcomputer system.

20. The sheet collator of claim 16, comprising sheet passage detection means associated with said common sheet conveyor path for detecting the passage of a set of sheets ejected from a plurality of said loading pockets.

21. The sheet collator of claim 20, wherein said sheet passage detector associated with said common sheet conveyor path generates a "last sheet" detection signal used to determine the completion of each collating cycle.

* * * * *